United States Patent
Thon (10) Patent No.: US 11,494,195 B2
(45) Date of Patent: Nov. 8, 2022

(54) INTERFACE DEVICE AND METHOD FOR CONFIGURING THE INTERFACE DEVICE

(71) Applicant: Siemens Aktiengesellschaft, Munich (DE)

(72) Inventor: Ingo Thon, Grasbrunn (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 94 days.

(21) Appl. No.: 17/069,068

(22) Filed: Oct. 13, 2020

(65) Prior Publication Data
US 2021/0109764 A1    Apr. 15, 2021

(30) Foreign Application Priority Data
Oct. 14, 2019   (EP) ..................................... 19202946

(51) Int. Cl.
G06F 9/4401   (2018.01)
G06N 20/00   (2019.01)
(Continued)

(52) U.S. Cl.
CPC .............. G06F 9/4411 (2013.01); G06F 8/60 (2013.01); G06F 13/20 (2013.01); G06N 20/00 (2019.01)

(58) Field of Classification Search
CPC .......... G06F 9/4411; G06F 8/60; G06F 13/20; G06N 20/00
See application file for complete search history.

(56) References Cited

U.S. PATENT DOCUMENTS

2002/0147503 A1* 10/2002 Osburn, III ........ G05B 23/0221
                                                                  700/9
2004/0213285 A1   10/2004 Stevenson et al.
(Continued)

FOREIGN PATENT DOCUMENTS

EP          3376373         9/2018

OTHER PUBLICATIONS

Anonymous:; "Remote Automation Solutions Instruction Manual ControlWave Station Manager Configuration Manual"; pp. 1-94; 2019.
(Continued)

Primary Examiner — Henry Tsai
Assistant Examiner — John B Roche
(74) Attorney, Agent, or Firm — Cozen O'Connor (57) ABSTRACT

A method for configuring an interface device connected to a control device and a field device, wherein the method includes receiving a first machine learning application having a plurality of logical components connected in a pipeline, where the first machine learning application serves to analyze a signal from the field device utilizing a first machine learning model, generating a plurality of code blocks utilizing a translator based on the plurality of logical components of the first machine learning application, connecting the plurality of code blocks in accordance with the pipeline of the first machine learning application to generate a first output from the signal from the field device, and deploying the connected code blocks on firmware of the interface device including creating a virtual port connectable to the control device, and where the virtual port serves to transmits the first output to the control device.

15 Claims, 5 Drawing Sheets

(51) Int. Cl.
*G06F 8/60* (2018.01)
*G06F 13/20* (2006.01)

(56) References Cited

U.S. PATENT DOCUMENTS

| | | | |
|---|---|---|---|
| 2004/0260429 A1* | 12/2004 | Saelens | B05B 12/085 |
| | | | 700/283 |
| 2008/0249641 A1 | 10/2008 | Enver et al. | |
| 2016/0098037 A1* | 4/2016 | Zornio | H04L 41/0803 |
| | | | 700/20 |
| 2020/0012500 A1 | 1/2020 | Kern et al. | |
| 2020/0133662 A1* | 4/2020 | Smith | G06F 9/54 |

OTHER PUBLICATIONS

Anonymous: "DeltaV Distributed Control 1-15 System Product Data Sheet S-series Virtual I/O Module 2"; 2019.
EP Search Report dated Apr. 14, 2020 based on EP19202946 filed Oct. 14, 2019.

* cited by examiner

INTERFACE DEVICE AND METHOD FOR CONFIGURING THE INTERFACE DEVICE

BACKGROUND OF THE INVENTION

1. Field of the Invention

The present invention relates to interface devices used in industrial automation and, more particularly, to the deployment of machine learning based industrial applications on interface devices.

2. Description of the Related Art

Interfaces devices such as interface modules, I/O modules, etc., are used in industrial automation systems for connecting a plurality of field devices with the control systems in the industrial facility. The interface devices transmit process data from the field devices (such as sensors) to the control devices and transmit control data (such as target values or target commands) from the control devices to the field devices (such as actuators).

With the advent of machine learning and artificial intelligence techniques, a plurality of industrial applications based on these techniques have been developed. In conventional automation systems, artificial intelligence (AI) applications are typically run in controllers, servers and edge devices. Accordingly, the process data from field devices of automation system must be transmitted to the controllers and edge devices via interface devices. In turn, this requirement has increased the load on the communication paths of the interface devices, which often leads to increased cycle time or latency in the communication paths.

To address this additional load on the communication path of the interface devices, one approach is to address the communication channel. For example, a more efficient field bus, (such as Gigabit Ethernet Hardware) may be utilized. In another example, a secondary sensor system with a completely new cabling may be provided. However, both of approaches result in higher costs and may requires downtime.

Another approach is to shift the processing to the field devices themselves. Here, the AI applications are executed directly on the field devices themselves. This approach, however, only works if all data is available on the field devices and if the field devices are sufficiently sophisticated. Additionally, if all the field devices are not from one provider, then a different AI engineering framework must be used for each field device. Accordingly, this results in additional complexity during engineering because AI engineering is not integrated in the engineering framework of the automation system.

SUMMARY OF THE INVENTION

In view of the foregoing, it is therefore an object of the invention to provide a method and interface device which address the issues associated with the additional load on a communication path of interface devices during transmission of process data from field devices of automation system controllers and edge devices via the interface devices.

This and other object and advantages are achieved in accordance with the invention by a method in which machine learning applications are implemented in the interface devices. In accordance with the invention, applications based on machine learning or artificial intelligence models, are divided into plurality of logical components connected in a pipeline and a plurality of code blocks are then generated using a translator based on the plurality of logical components.

These code blocks are connected in accordance with the pipeline, so as to generate a first output from at least one signal from at least one field device. Finally, the connected code blocks are deployed on the interface device to generate the first output. Accordingly, by implementing the machine learning applications in the interface devices, the entirety of the process data from the field devices do not need to be transferred to the controllers. Additionally, most machine learning applications typically transform or aggregate data. Consequently, the amount of data to be transferred between the interface device and control device is reduced even more.

In accordance with the invention, the method configures an interface device connected to a control device and at least one field device, where the method comprises receiving a first machine learning application comprising a plurality of logical components connected in a pipeline, generating a plurality of code blocks using a translator, based on the plurality of logical components, connecting the plurality of code blocks in accordance with the pipeline of the first machine learning application to generate a first output from at least one signal from the at least one field device, and deploying the connected code blocks on a firmware of the interface device. Deploying the connected code blocks includes creating at least one virtual port connectable to the control device. The at least one virtual port serves to transmit the first output to the control device. The first machine learning application serves to analyse at least one signal from the at least one field device using a first machine learning model. Additionally, each code block is associated with a particular logical component from the plurality of logical components.

In an exemplary embodiment, creating at least one virtual port comprises identifying a first physical output port from a plurality of physical input and output ports, where the first physical output port is available for transmitting a signal to the control device. By enabling mapping between the virtual port and physical port, the first output can be transmitted via the physical port. Additionally, the first output is connected to the virtual port. As a result, the virtual port may be mapped to a different physical port in cases in which the original physical port is unavailable.

In an additional exemplary embodiment, the method further comprises generating a capability file associated with the interface device, where the capability file comprises a definition of the at least one virtual port and transmits the generated capability file associated with the interface device to an engineering tool for linking the at the least one virtual port with the control device. Through these steps, engineering of control systems, comprising the interface device with the machine learning model, is enabled. The machine learning model functionality enabled in the interface device is abstracted and only the output of the functionality (realized by the connected code blocks) is defined in the capability file and used in engineering. Thereby, the need for a complex artificial framework in engineering is eliminated because the machine learning application implemented in the interface device is abstracted and treated as a signal from interface device.

In another embodiment, the method further comprises creating at least one virtual input port associated with a data source of the interface module, where the at least one virtual input port serves to provide an input to at least one code block from the connected code blocks. In this manner, internal data available only in the interface devices may also be used by the connected code blocks for analyzing the signal from the at least one field device.

In an exemplary embodiment, the step of generating the plurality of code blocks comprises determining at least one predefined library associated with each logical component from the plurality of logical components. Each predefined library includes at least one library routine for realizing the corresponding logical component and accordingly, provides a standardized manner for realizing AI functions without requiring considerable technical know-how.

In another exemplary embodiment, the step of generating a plurality of code blocks further comprises determining a plurality of values for a plurality of parameters associated with the first machine learning model based on a first optimization technique. This allows for easy configuration of the machine learning model without requiring considerable technical expertise in relation to the machine learning techniques. In another exemplary embodiment, the first machine learning model is trained using the historic data of the signal from the at least one field device for determining at least one model parameter of the first machine learning model. Accordingly, the machine learning model is tuned for the at least one field device and therefore provides improved performance. Additionally, in another exemplary embodiment, the determination of the values for the parameters associated with the first learning model is based on the historic data from the at least one field device. Accordingly, this allows for customization of the model in accordance with the particular field device and the industrial application and conditions in which the field device is deployed.

It is also an object of the invention to provide an interface device connected to at least one field device and a control device. In accordance with the invention, the interface device comprises one or more input and output ports for receiving and transmitting signals between the control device and the at least one field device, and a firmware module comprising a plurality of connected code blocks to receive at least one signal from at least one field device and produce to generate a first output. The one or more input and output ports include at least one virtual output port for transmitting the first output to the control device. The plurality of connected code blocks are generated using a translator, based on a plurality of logical components of a first machine learning application for analyzing at least one signal from the at least one field device using a first machine learning model. Each code block is associated with a particular logical component from the plurality of logical components.

It is also an object of the invention to provide a non-transitory storage medium for configuring an interface device which connected to a control device and at least one field device, where the non-transitory storage medium includes machine-readable instructions stored therein, which when executed by a processing unit, cause the processing unit to receive a first machine learning application comprising a plurality of logical components connected in a pipeline, generate a plurality of code blocks using a translator, connect the plurality of code blocks in accordance with the pipeline of the first machine learning application, to generate a first output from the at least one signal from the at least one field device, and deploy the connected code blocks on a firmware of the interface device including creating at least one virtual port connectable to the control device, where the at least one virtual port serving to transmits the first output to the control device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The following detailed description references the drawings, in which.

DETAILED DESCRIPTION OF THE EXEMPLARY EMBODIMENTS

Figure 1:
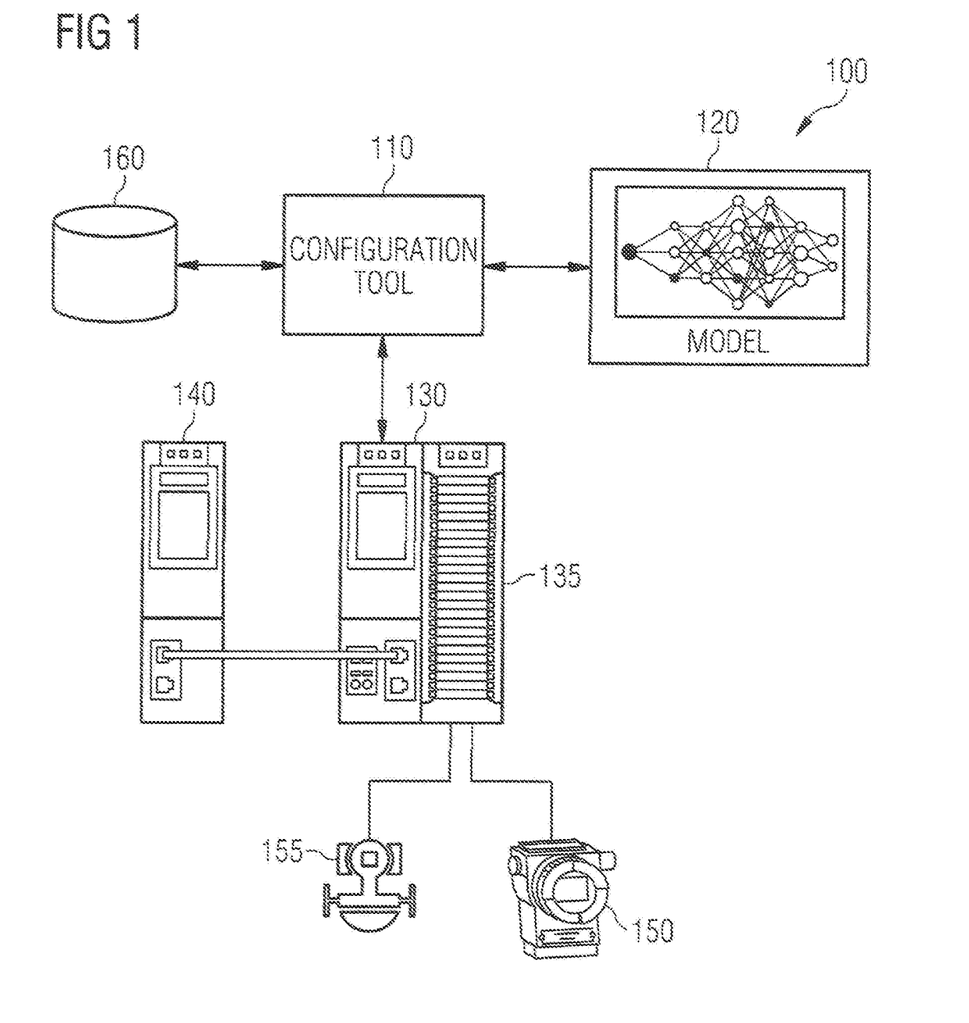
FIG. 1 illustrates an exemplary schematic block diagram of an industrial system with a plurality of industrial devices in accordance with the invention.

FIG. 1 illustrates an industrial automation system 100 in an industrial facility. Industrial facility herein refers to any environment where at least one industrial process, such as manufacturing, refining, smelting or the assembly of equipment, may occur. Examples of industrial facility includes process plants, oil refineries, and/or automobile factories. The industrial automation system 100 includes a plurality of control devices, such as process controllers, programmable logic controllers (shown in the figure as controller or control device 140), supervisory controllers, and/or operator devices.

The controllers (shown as control device 140) are connected via a plurality of peripheral or interface devices (shown in the figure as interface module 130 and I/O module 135) to a plurality of field devices such as actuators and sensor devices (for example, shown in figure as flowmeter 155 and pressure transmitter 150) for monitoring and controlling industrial processes in the industrial facility. These field devices can include flowmeters, value actuators, temperature sensors and/or pressure sensors. The field devices are connected to the I/O modules (shown as I/O module 135 in the figure). The I/O modules transmit process values to the interface module 130. The interface module 130 is connected to the controller 140 and communicates the process values to the controller 140. The controller 140 receives process values from the sensors (150 and 155) that are connected to the I/O module 135 via the interface module 130. Based on the process values process, the controller 140 generates control commands for the actuators connected to the I/O module 135 and the interface module 130 to control and regulate industrial processes in the industrial facility.

As mentioned above, the interface module 130 and I/O module 135 are collectively referred to as interface devices. Interface device as mentioned herein refers to as at least one device between the field devices and the devices on and above the control network. Interface devices establish connection between the field devices and the other devices in the industrial automation system 100. Examples of interface devices includes interface modules, I/O modules (analog and digital), gateway devices and/or remote terminal units (RTUs).

In accordance with the invention, at least one industrial application based on machine learning models is deployed on the interface devices. The industrial applications analyze signals from the field devices connected to the interface devices. The industrial applications include one or more machine learning models that are used in the analysis of the signals (also referred to as process data or data) from the field devices. The output from the industrial applications on the interface devices are then transmitted to the control devices. The control devices utilize the output from the industrial applications to control or regulate the processes in the industrial facility via actuators and/or raise alarms in case of process or device anomalies. Examples of industrial applications include a ball bearing monitoring application based on neural network and/or a motor monitoring application based on a Z score statistical model.

The industrial automation system 100 additionally includes a configuration tool 110 for configuring the interface module 130 and deploying the industrial application on the interface module 130. The configuration tool 110 is connected to the interface module 130 and to a repository (not shown in FIG. 1) comprising at least one industrial application based on machine learning models (shown in figure as machine learning model 120). The configuration tool 110 deploys at least one industrial application on the interface module 130. The configuration tool 110 is configured to generate code blocks from the one or more machine learning industrial applications and deploy the code blocks associated with the applications on the interface 130. Further the configuration tool 110 creates one or more virtual ports on the interface module 130 for meaningfully transmitting output from the code blocks deployed on the interface module 130.

Additionally, the configuration tool 110 updates the capability file associated with the interface module 130 to reflect the virtual ports created. Subsequently, the configuration tool 110 transmits the updated capability file to an engineering tool for use in engineering of control loops including virtual ports of the interface device. These aspects are further explained in the description of FIG. 2. While the current disclosure is explained using interface module 130, the methods as disclosed herein are equally applicable to I/O module 135 and various other interface devices.

Figure 2:
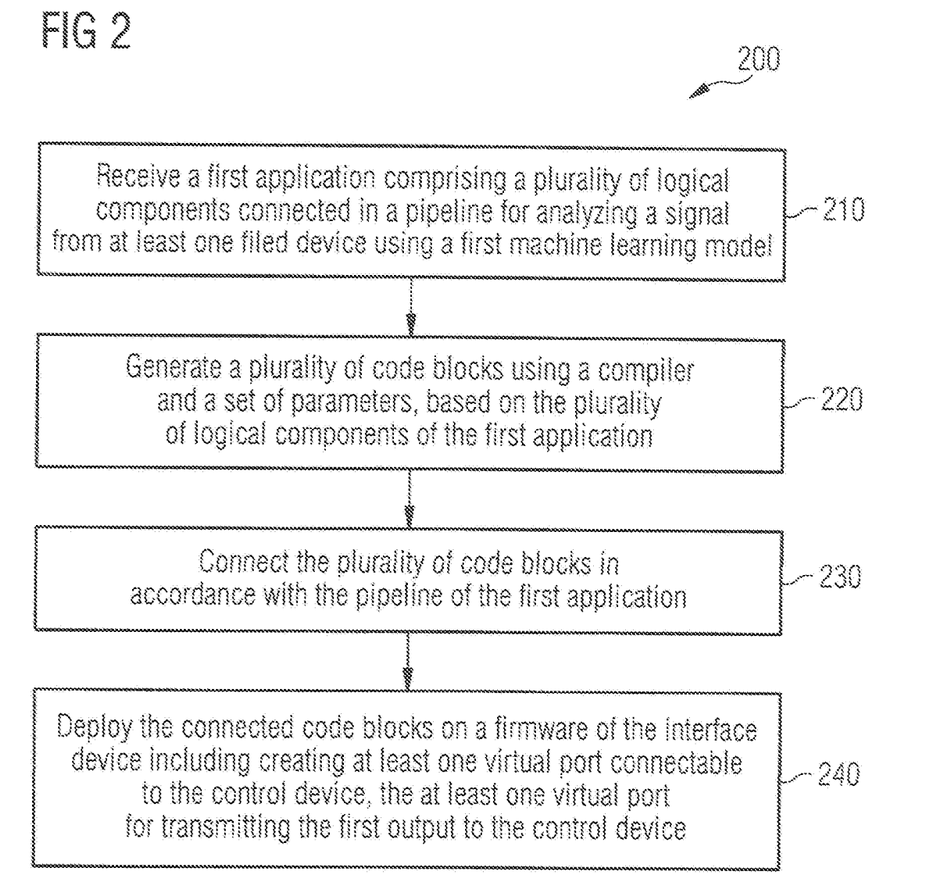
FIG. 2 illustrates an exemplary flowchart of the method for configuring an interface device in accordance with the invention.

FIG. 2 illustrates a method 200 for configuring an interface device (130 or 135) connected to a control device 140 and at least one field device (150 or 155) using the configuration tool 110. At step 210, the configuration tool 110 receives a first machine learning application comprising a plurality of logical components connected in a pipeline. Pipeline herein refers to connection amongst the logical components in a sequence in which each preceding logical component acts as a producer producing an output, and the succeeding logical component acts as a consumer, consuming the output from the preceding logical component. Pipeline may include serial and parallel paths. The first machine learning application is for analyzing at least one signal from the at least one field device using a first machine learning model 120. The logical components are connected in a pipeline and act as a chain of producer and consumers routines. Each logical component is associated with a processing operation to be performed on the signal from the at least one field device (150 or 155) or an output from another logical component. The plurality of components includes a component associated with the first machine learning model 120, with one or more components for preprocessing the at least one signal from the at least one field device (150 or 155) in accordance with first machine learning model 120.

In an exemplary embodiment, the first machine learning application is a ball bearing monitoring application based on neural network. The ball bearing monitoring application comprises four logical components. The first logical component is an input normalization component. The input to the input normalization component is a signal from a vibration sensor attached on a ball bearing. The input normalization component normalizes the vibration signal from the vibration sensor using a linear normalization technique. The normalized signal is then provided to the windowing component. The windowing component receives the normalized signal from the input normalization component and creates multiple windows or segments of the normalized vibration signal. The segments of the normalized vibration signal are then provided to the Fast Fourier transformation component. The Fast Fourier transformation component applies Fast Fourier transformation on the segments of the normalized vibration signal and transforms the signal from time domain to frequency domain. The transformed signal segments are then provided to the two-layer neural network component. The two-layer neural network is trained for classifying the transformed signals for detecting a condition of the ball bearing. In an exemplary embodiment, the two-layer neural network is trained based on historic vibration data from a plurality of ball bearings in various conditions. Based on this training, the neural network is capable of determining the health of the current ball bearing by classifying the vibration signal from the vibration sensor.

In an exemplary embodiment, the first machine learning application includes an application template or a model exchange format comprising component information on each logical component from the plurality of logical components. The component information includes one or more parameters for configuration of the logical component and a reference to a library routine for implementing the logical component. In an example, the first machine learning application is predefined using an International Electrotechnical Commission (IEC) 61131-3 language (such as function block diagram, structured text, ladder diagram or sequential function chart). In another exemplary embodiment, the first machine learning application is defined using predictive model markup language (PMML). In yet another exemplary embodiment, the first machine learning application is defined using Open Neural Network Exchange (ONNX) format. In an exemplary embodiment, the first machine learning application is stored on a cloud repository and is selected by operators or engineering personnel during engineering of the industrial system 100 or operation of the same.

At step 220, the configuration tool 110 generates a plurality of code blocks using a translator (for example compiler or interpreter) of the configuration tool 110, based on the plurality of logical components of the first machine learning application. Each code block is associated with a particular logical component from the plurality of logical components. Each code block is composed of program code (for example, mid or low level language code such as Very High Speed Integrated Circuit Hardware Description Language (VHDL), assembly language code, binary code or machine executable code) and is executable on the interface device (interface module 130 or I/O module 135) for realizing the processing operation associated with the corresponding logical component.

In an exemplary embodiment, the configuration tool 110 is connected to a repository 160 containing a plurality of libraries associated with the one or more interface devices in the industrial automation system 100. Each library includes one or more library routines, which after compilation by the translator, may be executed by the associated interface device for realizing a particular processing operation. For example, a first library may include one or more library routines that may be executed by interface devices of a particular type from a particular manufacturer for performing fast Fourier transformation.

While generating the plurality of code blocks, the translator of the configuration tool 110 determines one or more predefined libraries associated with one or more logical components from the plurality of logical components. Each predefined library includes one or more library routines for realizing the corresponding logical component. The translator of the configuration tool 110 utilizes the one or more predefined libraries in generating the code blocks by linking library routines from the predefined libraries.

In an embodiment, one or more code blocks are generated by the translator on the basis of a plurality of configuration parameters (also referred to as parameters) associated with the corresponding logical component. The configuration parameters determine the configuration of the code block generated from the associated logical block. In an exemplary embodiment, the values of the configuration parameters are included in the logical component. In another exemplary embodiment, the values of the configuration parameters are determined on the basis of training and validation data from the at least one field device. Training and validation data include historic signal data from the at least one field device.

In a further exemplary embodiment, the configuration parameters of a logical component associated with the first machine learning model includes a learning rate, batch size, or number of epochs. For example, the configuration parameters associated with the neural network component includes weights of the network nodes, number of hidden nodes in the intermediate layers, or number of intermediate layers.

Similarly, in another exemplary embodiment, a configuration parameter associated with a normalization component determines the type of normalization to be applied on the input data. For example, a configuration parameter of a normalization component is for determining whether z score normalization or min-max normalization is to be applied on the signal or data from the field device. In an exemplary embodiment, the configuration parameters of the normalization component are determined based on statistical distribution of training data (i.e., historic data of the field device). This allows for customization of the machine learning model according to the at least one field device without requiring considerable human intervention.

In another embodiment, the configuration parameters of a logical component associated with the first machine learning model 120 includes one or more model parameters and one or more model hyperparameters. The one or more model parameters are determined based on training data of the field device. In an exemplary embodiment, the one or more model parameters of a neural network component, such as the weights of the nodes in the neural network, are determined from the training data. Similarly, the one or more model hyperparameters of a neural network component (for example, number of hidden nodes in the intermediate layers, or number of intermediate layers) are determined using a hyperparameter tuning technique, such as grid search, Bayesian optimization, or evolutionary optimization.

In an exemplary embodiment, the configuration tool 110 determines a number of nodes in the hidden layers and dropout values of a neural network logical component. Dropout determines the percentage of nodes that are zeroed out during training for each training sample/iteration. With a random search, the hyperparameters are sampled from predefined distributions. This can be a binominal distribution for the hidden nodes and a beta distribution for the dropout. Accordingly, a random parameter set could be (hidden nodes, dropout)={(25,0.29), (22,0.2), (24,0.23), (14, 0.26), (18,0.23), (24,0.24), (17,0.26), (13,0.18), (23,0.27)}

Sampled with parameters (size=50, p=0.4) for the binominal distribution and (20,60) for the beta distribution. From the current gaussian process, an acquisition function can be derived. The acquisition function can, for example, propose the point with the biggest expected improvement or maximize the knowledge.

At step 230, the configuration tool 110 connects the generated code blocks accordingly to the pipeline of the first machine learning application to generate a first output. Accordingly, the output of a first code block is connected to the second code block as an input as per the pipeline of the first machine learning application. Accordingly, the outputs and inputs of the code blocks are chained in accordance to the pipeline of the first machine learning application. Finally, the output of the connected code blocks, referred to as the first output, is generated.

At step 240, the connected code blocks are deployed on the firmware module on the interface device. The connected code blocks are installed on the interface device. At least one virtual port is then created for connecting and providing the first output to the control device. The at least one virtual port transmits the first output to the control device. To create at least one virtual port in the interface device, the configuration tool 110 identifies a first physical output port from a plurality of physical input and output ports of the interface device, where the first physical output port is available for transmitting a signal to the control device. Firmware module herein refers to an execution environment in which the code blocks may be executed, and accordingly refers to processors and memory units collectively. This is further explained in relation to FIG. 3.

Figure 3:
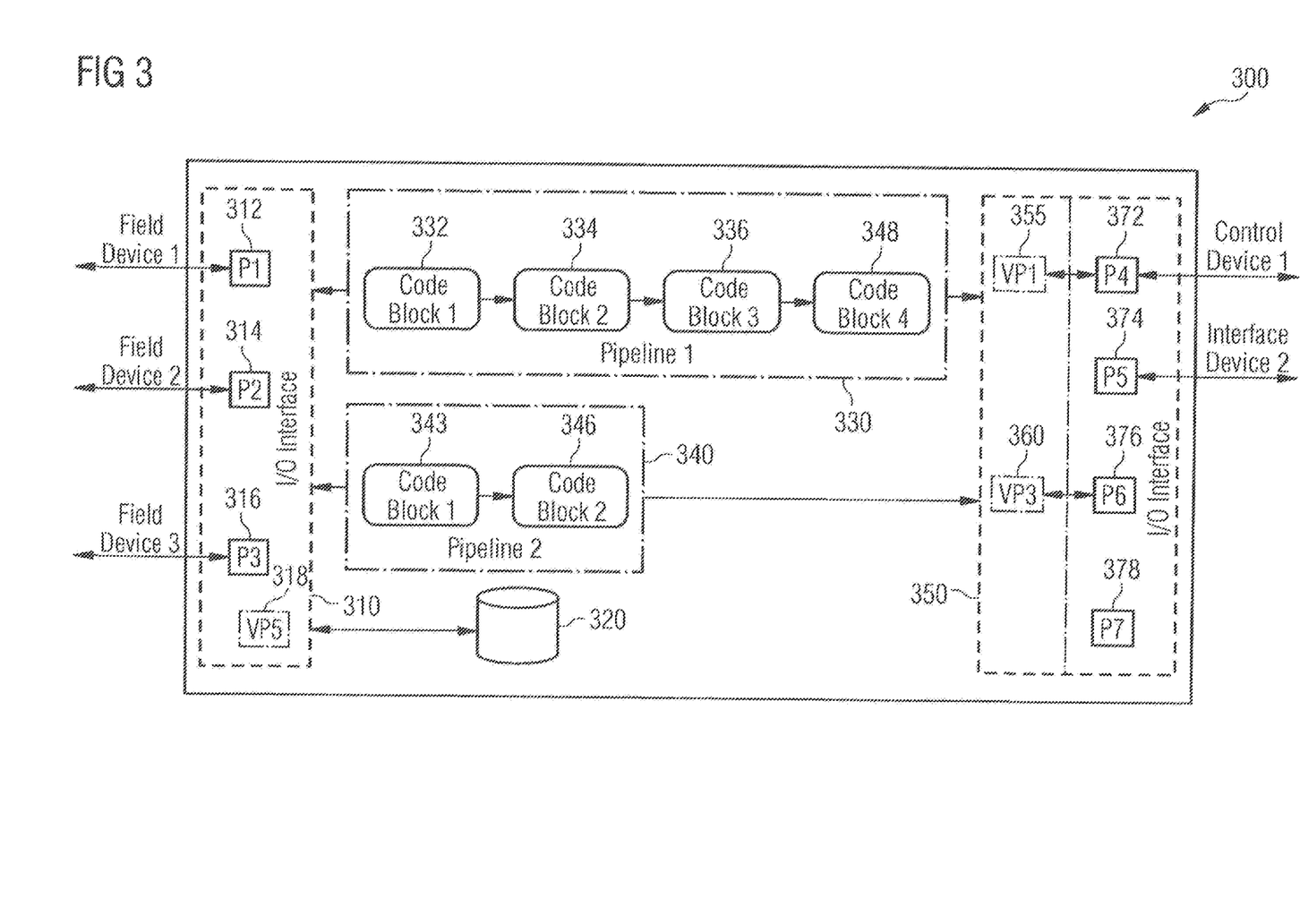
FIG. 3 illustrates an exemplary schematic block diagram of an interface device configured in accordance with the method of FIG. 2.

FIG. 3 illustrates an interface device (for example, an interface module 300) with the connected code blocks deployed on the interface module 300. The interface module 300 includes at least one I/O interface (shown as I/O interfaces 310 and 350). Each I/O module includes a plurality of ports. The plurality of ports includes input ports (shown in the figure as ports 312, 314 and 316), output ports (shown in the figure as ports 372, 374, 376 and 378) and virtual ports (shown in the figure as virtual ports 318, 355 and 360).

The input port 312 is connected to a field device 1 (for example, vibration sensor installed on a ball bearing) for receiving a vibration signal associated with the ball bearing. The input port 314 is connected to a field device 2 (for example, a current sensor on a motor) for receiving current data of the motor. The input port 316 is connected to a field device 3 (for example a voltage sensor on a motor) for receiving voltage data of the motor. The virtual port 318 is a virtual input port and is connected to a data source 320 internal to the interface module 300. In an example, the data source 320 includes voltage applied on a laser sensor and is utilized by the interface device in determining if the laser sensor is working with anomalies and if the distance readings from the laser sensors may be utilized.

The virtual port 355 is connected to a first set of connected code blocks 330 for transmitting the output from the first set of connected code blocks 330. The virtual port 355 is mapped to the physical port 372 and is capable of transmitting the output of the first set of the connected code blocks 330 to the control device 1. Similarly, the virtual port 360 is connected to a second set of connected code blocks 340 for transmitting the output from the second set of connected code blocks 340. The virtual port 360 is mapped to the physical port 376 and is capable of transmitting the output of the second set of the connected code blocks 330. The output port 374 is connected to a second interface device 2. The output port 378 is available for transmission of signal.

Figure 4:
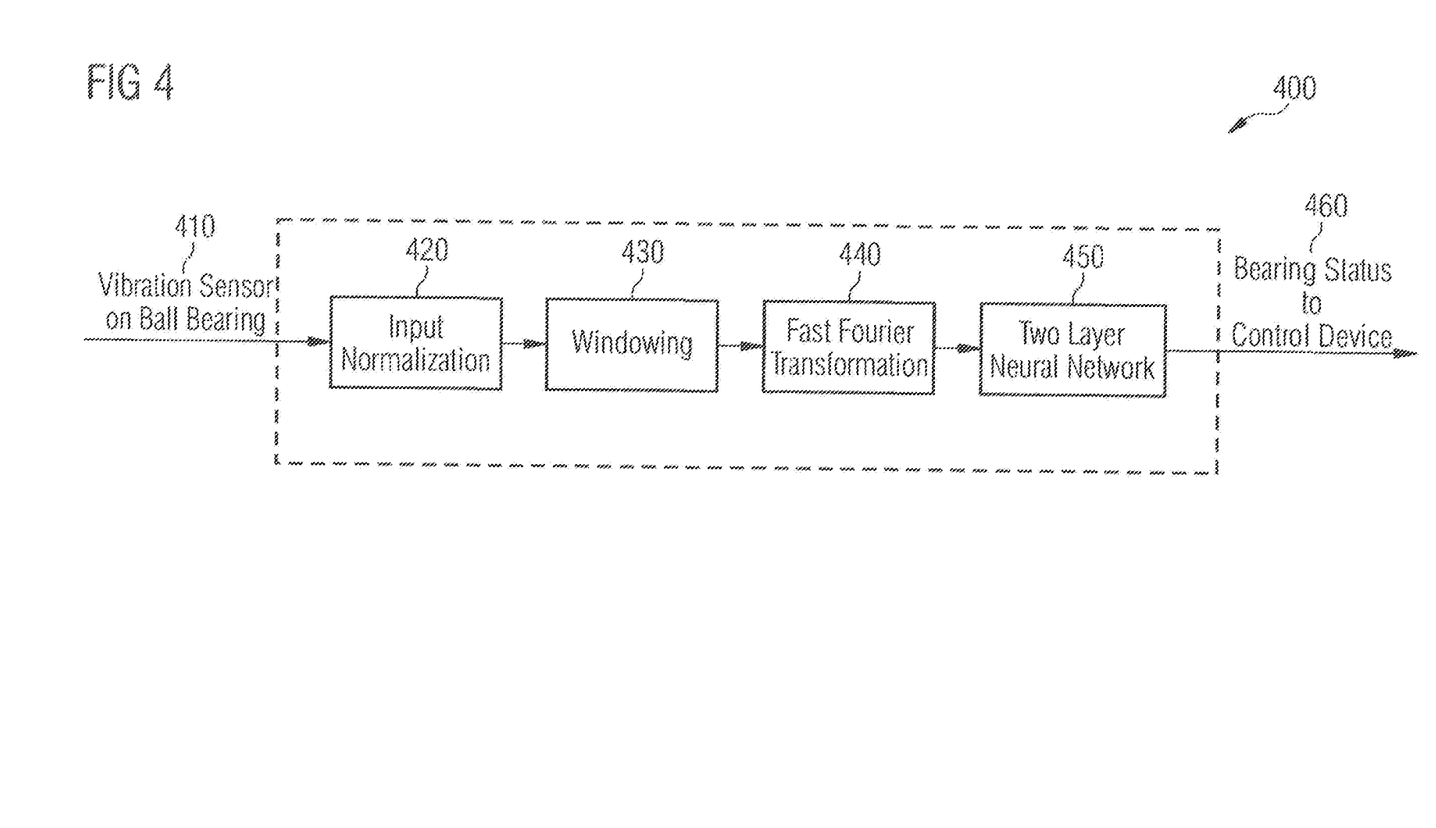
FIG. 4 illustrates an exemplary schematic block diagram of an industrial application including a plurality of logical components in a pipeline in accordance with the invention.

The first set of connected code blocks 330 receives vibration signal from the field device 1 via the input port 312. The first set of connected code blocks 330 comprises of four code blocks (code blocks 332, 334, 336 and 348) connected in a first pipeline. The first set of the connected code blocks is generated and deployed on the interface module 300 by a configuration tool 110 based on the first industrial application 400 (also referred to as machine learning application) as shown in FIG. 4.

The first machine learning application 400 is a ball bearing monitoring application based on a neural network. The ball bearing monitoring application 400 comprises four logical components (420, 430, 440, and 450). The first logical component 420 is an input normalization component and receives vibration signal from the vibration sensor attached on a ball bearing as input 410. The input normalization component 420 performs a normalization operation on the vibration signal 410 from the vibration sensor. The normalized signal is then passed to the windowing component 430. The windowing component 430 receives the normalized signal from the input normalization component and creates multiple windows or segments of the normalized vibration signal. The segments of the normalized vibration signal are then provided to the Fast Fourier transformation component 440. The Fast Fourier transformation component 440 applies Fast Fourier transformation on the segments of the normalized vibration signal and transforms the signal from time domain to frequency domain. The transformed signal segments are then provided to the two-layer neural network component 450. The two-layer neural network 450 is trained for classifying the transformed signals for detecting a condition of the ball bearing. In an exemplary embodiment, the two-layer neural network 450 is trained based on historic vibration data from a plurality of ball bearing in various conditions. Based on the signal segments, the neural network 450 determines a condition of the ball bearing as the first output 460.

The code blocks (code blocks 332, 334, 336 and 348) are generated by a translator of the configuration tool 110 based on the logical components (420, 430, 440 and 450). In an example, the code block 340 corresponding to the neural network component 348 is generated based a plurality of parameters determined by the configuration tool 110. The plurality of parameters includes one or more model parameters such as node weights. The one or more model parameters are determined from historic vibration data from the field device 1 by training the neural network model using the historic vibration data. Additionally, the plurality of parameters includes at least one model hyperparameter, such as number of nodes in the intermediate layers. The at least one hyperparameter is determined using the historic vibration data and a hyperparameter tuning technique such as Grid search, Bayesian optimization or evolutionary optimization, as described above.

The second set of connected code blocks 340 receives current data from the field device 2 via the input port 314 and voltage data from the field device 3 via the input port 316. The second set of connected code blocks 340 comprises of two code blocks (code blocks 343 and 346) connected in a second pipeline. The second set of the connected code blocks is generated and deployed on the interface module 300 by a configuration tool 110 based on the second industrial application 500 (also referred to as machine learning application) as shown in FIG. 5.

Figure 5:
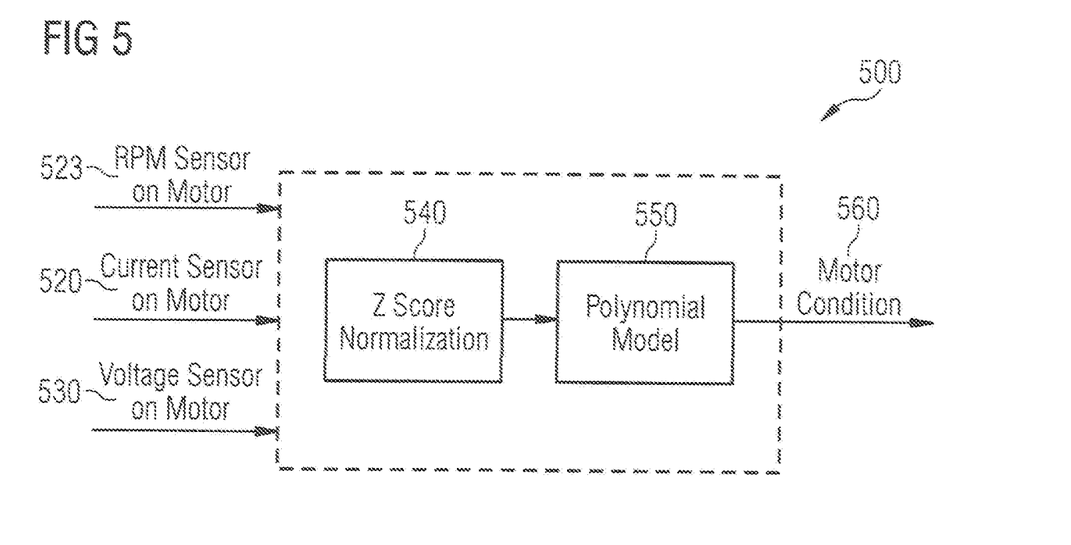
FIG. 5 illustrates another exemplary schematic block diagram of an industrial application including a plurality of logical components in a pipeline in accordance with the invention.

The second machine learning application 500 is a motor monitoring application based on Z score normalization and polynomial model as shown in FIG. 5. The motor monitoring application 500 comprises two logical components (540 and 550). The first logical component 540 is a normalization component that receives current, voltage and motor speed as inputs 520, 530 and 523. The normalization component 540 applies normalization on the speed, current and voltage data from the field devices connected. The second logical component 550 is a polynomial model modeling the speed-voltage characteristics of the motor. Based on the current value of the motor current, motor speed and voltage, the polynomial model component 550 determines whether an anomalous motor condition 560 is present.

In an exemplary embodiment, the configuration tool 110 generates a capability file associated with the interface device. The capability file comprises a definition of the at least one virtual port. The configuration tool 110 then transmits the generated capability file associated with the interface device to an engineering tool. The engineering tool utilizes the capability file for linking the at least one virtual port with the control device 140. The definition of the virtual port comprises a mapping between the at least one virtual port and the first physical output port, and information associated with the first output. Accordingly, during engineering the machine learning application is abstracted and is simply seen as an output from an output port in the interface device. This accordingly reduces complexity in engineering.

In another exemplary embodiment, the method further comprises creating at least one virtual input port associated with a data source of the interface module. The at least one virtual input port serves to provide input to at least one code block from the connected code blocks. As explained above, this helps in utilizing data from internal sources in the interface device for analysis.

The present disclosure can take the form of a computer program product comprising program modules accessible from computer-usable or computer-readable medium storing program code for use by or in connection with one or more computers, processing units, or instruction execution system. Accordingly, the current disclosure describes a non-transitory storage medium containing instructions for configuring an interface device connected to a control device and at least one field device. In an exemplary embodiment, the non-transitory storage medium forms part of the configuration tool 110. The configuration tool 110 includes a network interface connected to the interface device, and one or more processors (also referred to as processing unit) connected to the non-transitory storage medium or memory module storing one or more instructions. The one or more processors, upon execution of the one or more instructions, are configured to receive a first machine learning application comprising a plurality of logical components connected in a pipeline, generate a plurality of code blocks using a translator, based on the plurality of logical components of the first machine learning application, connect the plurality of code blocks in accordance with the pipeline of the first machine learning application, to generate a first output from the at least one signal from the at least one field device, and deploy the connected code blocks on a firmware of the interface device, where deploying the connected code blocks comprises creating at least one virtual port connectable to the control device, and where the at least one virtual port serves to transmits the first output to the control device. In an exemplary embodiment, the non-transitory storage medium further comprises machine-readable instructions stored therein, which when executed by the processing unit to generate a capability file associated with the interface device, where the capability file comprises a definition of the at least one virtual port and transmits the generated capability file associated with the interface device to an engineering tool for linking the at the least one virtual port with the control device. In another exemplary embodiment, the non-transitory storage medium further comprises machine-readable instructions stored therein which, when executed by the processing unit, create at least one virtual input port associated with a data source of the interface module, where the at least one virtual input port serves to provide an input to at least one code block from the connected code blocks.

For the purpose of this description, a computer-usable or computer-readable non-transitory storage medium can be any apparatus that can contain, store, communicate, propagate, or transport the program for use by or in connection with the instruction execution system, apparatus, or device. The medium can be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processing units and program code for implementing each aspect of the technology can be centralized or distributed (or a combination thereof) as known to those skilled in the art. Additionally, while the current disclosure describes the configuration tool 110 as an independent component, the configuration tool may be a software component and may be realized within a distributed control system or an engineering software suite. Additionally, in an embodiment, at least one part of the configuration tool 110 may be realized within the controller 140.

While the presently disclosed embodiments of the invention have been described in detail with reference to certain embodiments, it should be appreciated that the disclosed embodiments of the present invention are not limited to those embodiments. While, the disclosed embodiments of the present invention have been explained using a polynomial model and neural networks, these are examples and the current disclosed embodiments may be applied to other forms of machine learning based signal analytics. Similarly, while the disclosed embodiments of the present invention describe machine learning applications with single machine learning model, machine learning applications utilizing one or more models in ensemble may also be realized in the scope of the disclosed embodiments of the present invention. In view of the disclosed embodiments, many modifications and variations would be present themselves, to those skilled in the art without departing from the scope of the various embodiments, as described herein. The scope of the disclosed embodiments is, therefore, indicated by the following claims rather than by the foregoing description. All changes, modifications, and variations coming within the meaning and range of equivalency of the claims are to be considered within their scope. All advantageous embodiments claimed in method claims may also be apply to system/apparatus claims.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for configuring an interface device connected to a control device and at least one field device, the method comprising:
    a) receiving, by a configuration tool, a first machine learning application comprising a plurality of logical components connected in a pipeline, the first machine learning application serving to analyse at least one signal from the at least one field device utilizing a first machine learning model;
    b) generating, by the configuration tool, a plurality of code blocks utilizing a translator, based on the plurality of logical components of the first machine learning application, each code block being associated with a particular logical component from the plurality of logical components;
    c) connecting, by the configuration tool, the plurality of code blocks in accordance with the pipeline of the first machine learning application to generate a first output from the at least one signal from the at least one field device; and
    d) deploying, by the configuration tool, the connected plurality of code blocks on a firmware of the interface device, said deploying the connected code blocks comprising creating at least one virtual port connectable to the control device, the at least one virtual port for transmitting the first output to the control device.

2. The method as claimed in claim 1, the method further comprising:
    a1) generating a capability file associated with the interface device, the capability file comprising a definition of the at least one virtual port; and
    b1) transmitting the generated capability file associated with the interface device to an engineering tool for linking the at the least one virtual port with the control device.

3. The method as claimed in claim 1, the method further comprising:

creating at least one virtual input port associated with a data source of the interface device, the at least one virtual input port serving to provide an input to at least one code block from the connected code blocks.

4. The method as claimed in claim 1, wherein said generating the plurality of code blocks comprises determining at least one predefined library associated with each logical component from the plurality of logical components, each predefined library including at least one library routine for realizing the corresponding logical component.

5. The method as claimed in claim 1, wherein said creating at least one virtual port comprises identifying a first physical output port from a plurality of physical input and output ports; and
wherein the first physical output port is available for transmitting a signal to the control device.

6. The method as claimed in claim 1, wherein said generating a plurality of code blocks comprises determining a plurality of values for a plurality of parameters associated with the first machine learning model based on a first optimization technique.

7. The method as claimed in claim 1, the method further comprising:
training the first machine learning model utilizing historic data from the at least one field device.

8. The method as claimed in claim 2, wherein said generating a capability file further comprises generating the definition of the at least one virtual port, the definition of the at least one virtual port comprising a mapping between the at least one virtual port and a first physical output port, and information associated with the first output.

9. An interface device connectable to at least one field device and a control device, the interface device comprising:
a) at least one port for receiving and transmitting signals between the control device and the at least one field device;
b) a firmware module comprising a plurality of connected code blocks, the plurality of connected code blocks being configured to receive at least one signal from at least one field device and produce to generate a first output; wherein the at least one port includes at least one virtual port for transmitting the first output to the control device; and
wherein the plurality of connected code blocks are generated, by a configuration tool, utilizing a translator, based on a plurality of logical components of a first machine learning application for analysing at least one signal from the at least one field device utilizing a first machine learning model, each code block being associated with a particular logical component from the plurality of logical components.

10. The interface device as claimed in claim 9, wherein the at least one is associated with a capability file comprising a definition of the at least one virtual port; and
wherein the capability file serves to link the at the least one virtual port with the control device.

11. The interface device as claimed in claim 9, wherein the at least one port comprises at least one virtual input port associated with a data source of the interface module; and wherein the at least one virtual input port serves to provide an input to at least one code block from the connected code blocks.

12. The interface device as claimed in claim 10, wherein the at least one virtual output port is mapped to a first physical output port; and
wherein the definition of the at least one virtual output port includes a mapping between the at least one virtual output port and the first physical output port and information associated with the first output.

13. A non-transitory storage medium for configuring an interface device connected to a control device and at least one field device, the non-transitory storage medium having machine-readable instructions stored therein which, when executed by a processing unit, cause the processing unit to:
a) receive, by a configuration tool, a first machine learning application comprising a plurality of logical components connected in a pipeline, the first machine learning application serving to analyse at least one signal from the at least one field device utilizing a first machine learning model;
b) generate, by the configuration tool, a plurality of code blocks utilizing a translator, based on the plurality of logical components of the first machine learning application, each code block being associated with a particular logical component from the plurality of logical components;
c) connect, by the configuration tool, the plurality of code blocks in accordance with the pipeline of the first machine learning application to generate a first output from the at least one signal from the at least one field device; and
d) deploy, by the configuration tool, the connected code blocks on a firmware of the interface device; wherein deploying the connected code blocks comprises creating at least one virtual port connectable to the control device, the at least one virtual port serving to transmit the first output to the control device.

14. The non-transitory storage medium as claimed in claim 13, wherein the non-transitory storage medium further comprises machine-readable instructions stored therein which, when executed by the processing unit, cause the processing unit to:
a1) generate a capability file associated with the interface device, the capability file comprising a definition of the at least one virtual port; and
b1) transmit the generated capability file associated with the interface device to an engineering tool for linking the at least one virtual port with the control device.

15. The non-transitory storage medium as claimed in claim 13, wherein the non-transitory storage medium further comprises machine-readable instructions stored therein which, when executed by the processing unit, cause the processing unit to create at least one virtual input port associated with a data source of the interface module;
wherein the at least one virtual input port serves to provide input to at least one code block from the connected code blocks.

* * * * *